May 2, 1950 C. D. KNIGHT 2,506,365

TONE CONTROL CIRCUIT

Filed Aug. 27, 1945

INVENTOR.

COSLER DONALD KNIGHT

BY David M. Davis

Frank L. Mauritz

Murray Robinson

HIS ATTORNEYS

Patented May 2, 1950

2,506,365

UNITED STATES PATENT OFFICE 2,506,365

TONE CONTROL CIRCUIT

Cosler Donald Knight, Chicago, Ill., assignor to Zenith Radio Corporation, a corporation of Illinois Application August 27, 1945, Serial No. 612,926

1 Claim. (Cl. 179—171)

The present invention relates to amplifying circuits and more particularly to novel circuit arrangements for improving tone quality of signals applied to such circuits, for example, in radio transmitters, receivers, public address systems, phonographs, etc.

In the so-called table model radio receiver having a relatively small speaker and small cabinet, low frequency audible notes are more difficult to faithfully reproduce than are the high frequency audible notes and as a consequence one may in most present day receivers ascertain whether it is a so-called table model or floor model by the low frequency response thereof. Inasmuch as the size of a radio receiver including its speaker and cabinet influences greatly its ability to reproduce low frequency audible notes, it is desirable that there be some compensation provided for the deficiency in reproducing the low notes.

It is therefore an object of the present invention to provide a circuit for use in relatively small radio receivers to make them "sound" like large floor model receivers of the type which have a relatively large speaker and a relatively large cabinet which acts at least in part as a sounding board for low frequency audible notes.

Furthermore, it is desirable to produce compensation for loss of low frequency audible notes or "bass boost" by utilizing a regenerative circuit instead of a degenerative circuit since in the former case greater over-all gain may be realized for the same number of parts than is realized in the latter case wherein some of the available over-all gain is inherently suppressed. While the present invention relates particularly to arrangements for providing "bass boost" or compensation of loss in small table model receivers, the present invention finds applicability also in large floor model receivers where it is desired, for example, to reproduce predominantly the low frequency audible notes.

Another object of the present invention is to provide an improved "bass boost" circuit arrangement for universal use in any electrical system having currents therein of audible frequency.

Still another object of the present invention is to provide an improved and inexpensive "bass boost" circuit utilizing a minimum number of parts for use in radio receivers made in accordance with present day mass production methods.

Yet another object of the present invention is to provide an improved arrangement of a regenerative "bass boost" circuit which increases the over-all gain of the associated apparatus.

The features of the present invention which are believed to be novel are set forth with particularity in the appended claim. The present invention itself, both as to its organization and manner of operation, together with further objects and advantages thereof, may best be understood by reference to the following description taken in connection with the accompanying drawing in which:

Figure 1:
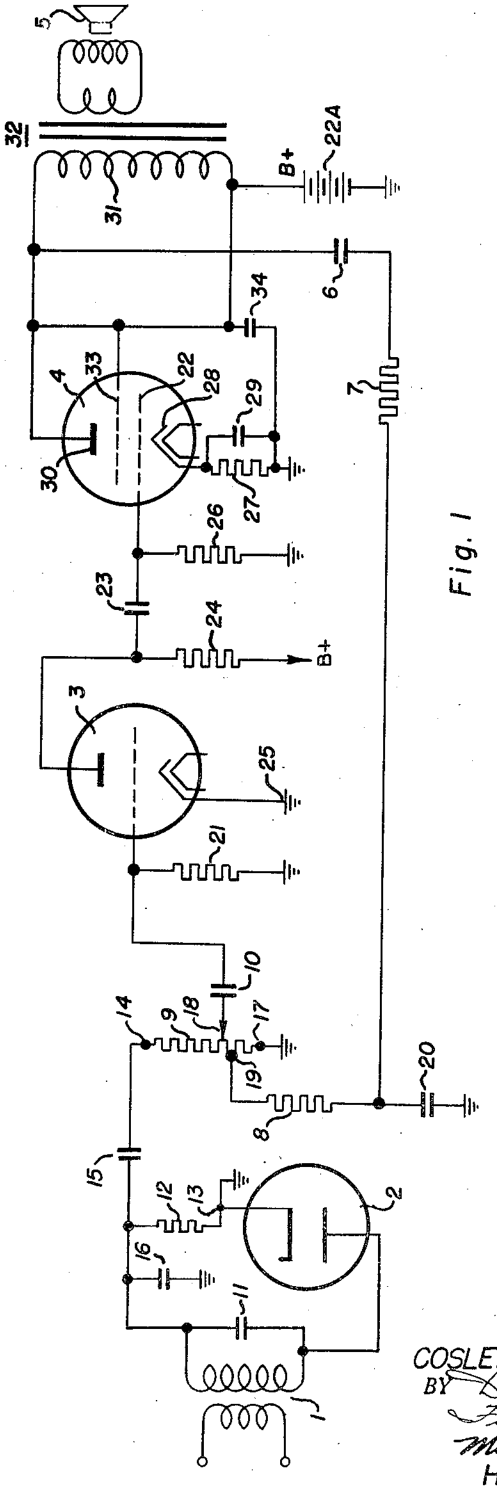
Figure 1 shows a circuit embodying the present invention.

In accordance with the embodiment of the present invention shown in Fig. 1, an audio frequency wave is impressed on a volume control resistance connected in the input circuit of an amplifying device, at least one element of a low frequency responsive circuit being connected with the volume control resistance and serving also as a common coupling element in a feedback circuit regeneratively connected to the output circuit of the amplifying device.

Referring more specifically to Fig. 1, signals applied, for example, to the secondary winding 1 of an intermediate frequency transformer of a radio receiver, are demodulated in rectifying device 2, amplified in amplifying device 3, further amplified in amplifying device 4, and then applied to speaker 5, a relatively small portion of the signal amplified by device 4 being fed back regeneratively from the output circuit of device 4 to the input circuit of device 3 through a path including condenser 6, resistors 7 and 8, volume control resistance 9 and condenser 10.

Secondary winding 1, tuned by condenser 11 to the carrier wave frequency on which audio signals are modulated, is serially connected in conventional fashion to the rectifying device 2 through a load resistance 12, the junction point of one terminal of resistance 12 and the cathode of device 2 being grounded as indicated at 13. The other terminal of resistance 12 is connected to the upper or ungrounded terminal 14 of volume control resistance 9 through a coupling condenser 15 for the passage of audio frequency currents, currents of carrier wave frequency being filtered by filter condenser 16 connected in shunt to resistance 12.

Volume control resistance 9 has its lower terminal 17 grounded, its variable tap 18 connected to the control grid of device 3 through condenser 10 and a fixed point 19 thereon connected to one terminal of resistance 8, the other terminal of resistance 8 being connected to ground through condenser 20 which serves important dual functions as explained below.

Grid leak resistance 21 connected between the main control electrode of device 3 and the grounded cathode of device 3 serves to provide a proper bias voltage in accordance with well-known principles.

The anode of device 3 is connected to control grid 22 of power amplifier device 4 through coupling condenser 23 which serves also to block flow of space current which would otherwise flow to grid 22 from the positive terminal of the anode voltage supply 22A through the anode resistance 24 serially connected between such terminal and the anode of device 3. The anode voltage source has its negative terminal grounded, for example, at point 25.

Grid leak resistance 26 is connected between control electrode 22 and ground, control electrode 22 being maintained at a suitable negative potential by space current flowing through resistance 27 which is connected between ground and cathode 28 and bypassed for audio frequencies by condenser 29.

A first portion of the signal developed on anode 30 is transferred to the primary winding 31 of output transformer 32 connected between anode 30 and the positive terminal of source 22A, while a second relatively small portion of such signal is transferred back to the input circuit of device 3 in regenerative phase through the network 6, 7 which is serially connected between anode 30 and the junction point of resistance 8 and condenser 20. Such first signal portion from anode 30 is applied to loudspeaker 5 connected to the secondary winding of transformer 32, while such second signal portion from anode 30 serves to increase the over-all gain of the apparatus and particularly to increase the over-all gain for signals of low frequency to provide a compensation for the failure of speaker 5 and its associated cabinet to reproduce low frequency notes as well as high frequency notes.

Amplifying device 4 is preferably of the screen grid type having its screen electrode 33 connected to the positive terminal of voltage source 22A for the flow of continuous current and connected to cathode 28 through condenser 34 to prevent the appearance of signal voltage on screen electrode 33.

The circuit comprising volume control potentiometer type resistance 9, resistance 8 and condenser 20 is termed a "bass boost" circuit connected with the control electrode of device 3. That is, inasmuch as condenser 20 connected in parallel with a portion of volume control resistance 9 has a reactance relatively high for signals of low audio frequency and a reactance relatively low for signals of high audio frequency, a proportionately greater voltage is developed at the control electrode of device 3 for low frequency signals than for high frequency signals of the same intensity appearing on resistance 12. Thus condenser 20 serves one important function apart from the regenerative circuit including resistance 7 and condenser 6 of which it also forms a part.

The magnitude of condenser 6 in relationship to the other circuit parameters, especially resistance 7 and condenser 20, should be large enough to allow the transmission of signals of large intensity in the desired audible frequency range above, for example, 90 cycles per second, and should be small enough in magnitude to limit considerably signals of, for example, 60 cycles and less. If condenser 6 were not of suitable small magnitude, the nonuseful audio frequencies would appear objectionable in relatively large magnitude across condenser 20.

In the regenerative feedback path including condenser 6, resistance 7 and condenser 20, the magnitudes of resistance 7 and condenser 6 are such that audio signals of low frequency fed back over such path appear in greater intensity across condenser 20 and at the control electrode of device 3 than do signals of high audio frequency of the same intensity at anode 30. It is thus evident that condenser 20 serves in two ways to increase the response for low audio signals over the corresponding response for high audio signals.

Certain ones of the circuit elements shown herein may, for example, have the following magnitudes: Volume control potentiometer type resistance 500,000 ohms, the resistance between points 17 and 19 thereon being 100,000 ohms; resistances 7, 8 and 21 being respectively 8.2 megohms, 22,000 ohms and 15 megohms and condensers 6, 10 and 20 being respectively .03, .004 and .04 microfarads.

Figure 2:
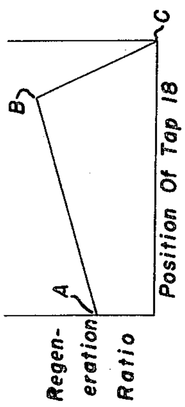
Fig. 2 shows graphically certain operating conditions of the circuit of Fig. 1.

It is noted that the amount of "bass boost" in the circuit described varies with the position of the tap 18 from point 14 to point 17. This variation is portrayed graphically in Fig. 2 wherein relative positions of the tap 18 are plotted linearly as abscissae and the corresponding magnitude of the regeneration ratio in the circuit is plotted linearly as ordinates, the regeneration ratio being defined as the ratio between the output signal at anode 30 obtained with no regeneration and the corresponding output signal at anode 30 obtained with regeneration.

It is desirable that the point B on the regeneration ratio curve corresponding to point 19 on the potentiometer type resistance 9 has a small ordinate by making point 19 as close to point 17 as possible without altering seriously the "bass boost" response obtained from use of the network 9, 8, 20 per se. The smaller the ordinate of point B, the smaller becomes its abscissa measured from point C and the less noticeable to an observer when he adjusts the volume control potentiometer type resistance 9 becomes the frequency response change. It is of course desirable that a change in volume control setting should not produce abrupt changes in the frequency response characteristics.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

An audio-frequency amplifying system comprising: an electron-discharge device having a cathode, an input electrode, and an output electrode; a volume control potentiometer having a variable tap and a second tap; means coupling one terminal of said potentiometer to said cathode; means coupling said variable tap to said input electrode; an output circuit coupled to said output electrode and to said cathode; a frequency selective circuit comprising series-connected impedance elements coupled to said output circuit and including a capacitance one terminal of which is coupled to said cathode; and means including a resistance coupling the other terminal of said capacitance to said second tap to complete a feedback path for supplying a portion of the voltage developed across said capacitance in regenerative phase to said input electrode, whereby said capacitance functions simultaneously to provide low-audio-frequency emphasis and high-audio-frequency deemphasis.

COSLER DONALD KNIGHT.

REFERENCES CITED

The following references are of record in the file of this patent:

UNITED STATES PATENTS

| Number | Name | Date |
|---|---|---|
| 2,217,178 | Masters | Oct. 8, 1940 |
| 2,289,752 | Bruck et al. | July 14, 1942 |
| 2,313,098 | Shepard, Jr. | Mar. 9, 1943 |
| 2,317,025 | Bond | Apr. 20, 1943 |
| 2,319,663 | Crowley | May 18, 1943 |
| 2,367,110 | Fayers | Jan. 9, 1945 |
| 2,374,071 | Barton | Apr. 17, 1945 |